(12) United States Patent
Maruyama et al.

(10) Patent No.: US 6,760,074 B1
(45) Date of Patent: Jul. 6, 2004

(54) PORTABLE ELECTRONIC COMPUTER

(75) Inventors: Yukinobu Maruyama, Kokubunji (JP); Takeshi Hoshino, Kodaira (JP); Takeshi Minemoto, Sagamihara (JP); Taisuke Kashima, Urawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/513,335

(22) Filed: Feb. 25, 2000

(30) Foreign Application Priority Data

Feb. 26, 1999 (JP) .......................................... 11-051129

(51) Int. Cl.⁷ ........................ H04N 5/225; H04N 5/222; H04N 1/00
(52) U.S. Cl. ................. 348/375; 348/376; 348/333.01; 348/333.06; 455/556
(58) Field of Search ............ 348/207.1, 333.01–333.13, 348/373, 375, 231.1, 376; 455/556, 551; D16/200, 202

(56) References Cited

U.S. PATENT DOCUMENTS

| | | | | |
|---|---|---|---|---|
| 4,420,773 A | * | 12/1983 | Toyoda et al. | 386/118 |
| 5,563,631 A | * | 10/1996 | Masunaga | 345/169 |
| 5,612,732 A | * | 3/1997 | Yuyama et al. | 348/14.01 |
| 5,666,159 A | * | 9/1997 | Parulski et al. | 348/211.2 |
| 5,729,289 A | * | 3/1998 | Etoh | 348/333.02 |
| 6,195,126 B1 | * | 2/2001 | Kikuchi et al. | 348/231.3 |
| 6,297,795 B1 | * | 10/2001 | Kato et al. | 345/684 |
| 6,370,282 B1 | * | 4/2002 | Pavley et al. | 382/311 |
| 6,411,332 B1 | * | 6/2002 | Whitby et al. | 348/376 |
| 6,427,078 B1 | * | 7/2002 | Wilska et al. | 455/550.1 |
| 6,462,780 B1 | * | 10/2002 | Stephany et al. | 348/372 |
| 6,570,583 B1 | * | 5/2003 | Kung et al. | 345/661 |
| 6,611,285 B1 | * | 8/2003 | Morita | 348/211.3 |
| 2002/0191096 A1 | * | 12/2002 | Tanaka et al. | 348/333.06 |

FOREIGN PATENT DOCUMENTS

| | | |
|---|---|---|
| JP | 11-45143 | 6/1989 |
| JP | 11-167532 | 6/1999 |

* cited by examiner

Primary Examiner—Wendy R. Garber
Assistant Examiner—Lin Ye
(74) Attorney, Agent, or Firm—Antonelli, Terry, Stout & Kraus, LLP (57) ABSTRACT

A portable electronic computer has a cabinet having a top case forming an upper surface of the cabinet, a bottom case forming a lower surface of the cabinet and a middle case interposed between the top case and the bottom case to form a side surface of the cabinet, a display unit provided on the upper surface of the cabinet so as to be visible from outside, at least one circuit board mounted to the lower surface of the cabinet and adapted to implement the function of a camera unit and the function of a portable information terminal, and a camera lens provided on the lower surface of the cabinet so as to be directed to the outside of the cabinet. The portable information terminal operates to display image information photographed by the camera unit or image information from an external apparatus on the display unit, the display unit has a displaying region for display of the image information and an operating region for operation of the camera unit and portable information terminal, the top case has a first opening corresponding to the displaying region of the display unit and a second opening corresponding to the operating region, and the middle case is mounted with a mode switching lever for switching the operation mode of the portable electronic computer between the camera unit and the portable information terminal and a scroll unit for scrolling image information displayed on the displaying region.

11 Claims, 10 Drawing Sheets

| JAPANESE GROWN-UP MALE | | JAPANESE GROWN-UP FEMALE | |
|---|---|---|---|
| A | 120mm | K | 100mm |
| B | 130mm | L | 100mm |
| C | 120mm | M | 118mm |
| D | 118mm | N | 92mm |
| E | 115mm | O | 94mm |
| F | 95mm | P | 100mm |
| G | 100mm | Q | 103mm |
| H | 125mm | R | 95mm |
| I | 110mm | S | 80mm |
| J | 97mm | T | 97mm |
| MEAN | 113mm | MEAN | 97.9mm |

FIG.11

PORTABLE ELECTRONIC COMPUTER

BACKGROUND OF THE INVENTION

The present invention relates to portable electronic computers and more particularly, to a portable electronic computer (hereinafter simply referred to as a portable computer) which has a digital camera or video camera, a display unit and the personal digital assistant function including a communication function to permit transmission of data inclusive of images to an external system and which can display an image photographed by the digital camera or an image from the external system such as a server on the display unit.

The portable computer having the camera function and the function to communicate with the external system has hitherto been known and with the computer, an object can be photographed by the video camera and the thus obtained image can be transmitted to the server by communication means so as to be recorded and saved in the server. The computer as above also has the display screen in the form of a liquid crystal display panel to enable the image taken by the video camera or the image read out of the server to be displayed on the display screen.

SUMMARY OF THE INVENTION

The portable computer of the aforementioned type has an increasing tendency toward size reduction and concomitantly, there arise problems in connection with the size of the display screen and the arrangement of the operation board.

More specifically, when the cabinet or casing of the computer is decreased in size, the display screen is allowed to be decreased in size proportionately only at the cost of visibility of images to be displayed on the display screen. Therefore, the extent of reduction in size of the display screen is limited and the size cannot be decreased excessively. Consequently, with the cabinet compacted, the percentage of the area occupied by the display screen increases.

On the other hand, even in this type of computer, the operation board for video camera and image display is of course needed and typically, it is disposed near the display screen. But as the display screen occupies a larger area, the area occupied by the operation board is inevitably reduced correspondingly or proportionately, with the result that the operation keys are decreased in size and cannot be operated with ease. To prevent such inconvenience, it is conceivable that touch keys for various kinds of function are displayed on the display screen. But the image to be displayed on the display screen narrowed sympathetically with the size reduction of the cabinet is small and overlap display of the touch keys aggravates visibility of images to be displayed.

Especially, the function of scrolling an image displayed on the display screen in up-down direction or in left-right direction is indispensable for the computer and means for implementing this function (scroll unit) is indispensably needed. The scroll unit, however, must have the function of carrying out scroll in at least four directions (up, down, left and right directions) and hence requires a relatively large space. Accordingly, with the computer compacted, the arrangement of the scroll unit matters significantly.

Besides, in the portable computer, it is desirable that various function extension units be provided without impairing good portability of the computer.

The present invention contemplates elimination of the above problems and it is an object of the present invention to provide a portable electronic computer in which a scroll unit can be arranged with a spatial margin and good operationability of scrolling can be maintained.

Another object of the present invention is to provide a portable electronic computer which can easily implement function extension without impairing portability.

To accomplish the above objects, a portable electronic computer according to one aspect of the invention incorporates a video camera or a digital camera and has scroll levers for scrolling an image displayed on a display screen on the side surface of a cabinet provided with the display screen.

A portable electronic computer according to another aspect of the present invention comprises:

- a cabinet including a top case, a bottom case and at least one middle case;
- a flat display unit mounted to the top case so as to be visible from outside;
- a circuit board mounted to the bottom case and having the function of a digital camera unit and the personal digital assistant function; and
- a function extension unit mounted to the middle case so as to be interposed between the display unit and the circuit board and being adapted to extend the function of the camera unit or the personal digital assistant function.

An embodiment of the function extension unit is a disk unit for supplementing a shortage of capacity of a built-in memory. Preferably, the disk unit includes a hard disk unit, an optical disk unit, an optomagnetic disk unit or a magnetic disk such as a floppy disk. Another embodiment of the function extension unit includes a public line connection medium such a wireless or wired communication line modem and a short-distance wireless connection medium such as a contactless IC card data transmitting/receiving unit or a short-distance wireless network connection transmitting/receiving unit. Still another embodiment of the function extension unit includes an extension board for improving the fundamental performance of the portable computer (such as a graphic accelerator) and a large-capacity battery for prolonging usable time of the portable computer.

DESCRIPTION OF THE PREFERRED EMBODIMENTS

Embodiments of the present invention will now be described with reference to the accompanying drawings.

Figure 1A:
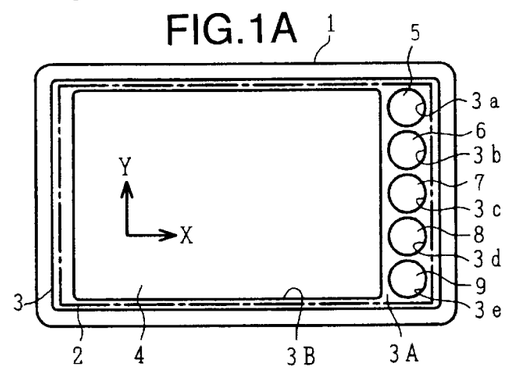
FIGS. 1A to 1F are diagrams showing the construction of an embodiment of a portable computer according to the present invention.
Figure 1B:
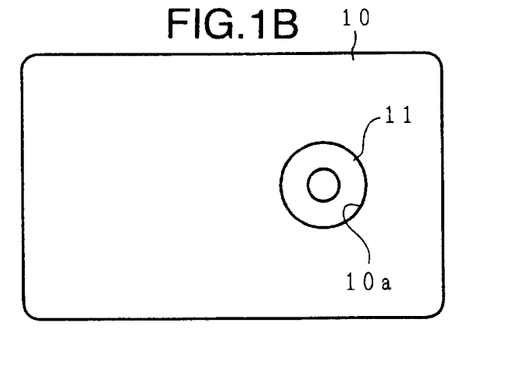
Figure 1C:
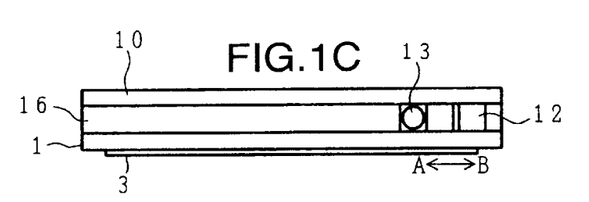
Figure 1D:
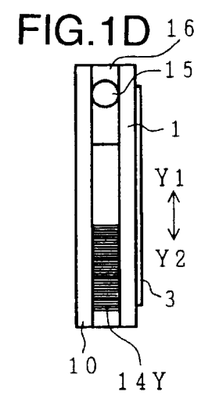
Figure 1E:
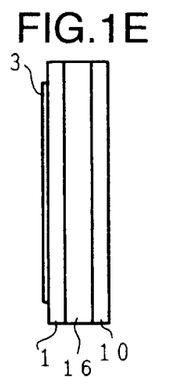
Figure 1F:
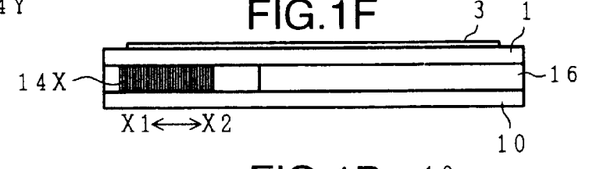

Referring to FIGS. 1A to 1F, there is illustrated an embodiment of a portable computer according to the invention. Of these figures, FIG. 1A is a front view, FIG. 1B is a rear view, FIG. 1C is a top view, FIG. 1D is a left side view, FIG. 1E is a right side view and FIG. 1F is a bottom view. As shown in these figures, the portable computer comprises a top case 1, a liquid crystal display panel 2, a frame 3, an operation board 3A, an opening 3B, openings 3a to 3e, a display screen 4, touch keys 5 to 9, a bottom case 10, an opening 10a, a camera lens 11, a mode switching lever 12, a recording button 13, an X direction scroll lever 14X, a Y direction scroll lever 14Y, a pen pocket 15 and a middle case 16.

In FIGS. 1A to 1F, the frame-like top case 1 integral with the frame 3, the substantially planar bottom case 10 and the frame-like middle case 16 having a predetermined width or thickness are combined with each other to form a cabinet or casing. From the standpoint of the cabinet, a major surface on the side of the top case 1 is a front surface, a major surface on the side of the bottom case 10 is a rear surface and a side surface of the middle case 16 forms a peripheral, side surface.

In the front surface of the cabinet, the liquid crystal panel 2 is pressed against the inner peripheral surface of the frame 3 so as to be mounted inside the top case 1 as shown in FIG. 1A. In the frame 3, the rectangular opening 3B is formed which contours substantially in the vicinity of the outer periphery of the frame 3. A right-hand marginal portion of the frame between the opening 3B and the right side of the frame is formed into a planar portion of narrow width which serves as the operation board 3A. In the frame, at the operation board 3A, a plurality of (here, five) openings 3a, 3b, 3c, 3d and 3e are formed in the vertical direction indicated by arrow Y. Inside the frame 3, the liquid crystal display panel 2 spreads across the opening 3B and the operation board 3A, as shown dot-dash line, and a portion of liquid crystal display panel 2 in register with the opening 3B acts as the display screen 4 for images.

A video camera or digital camera (not shown) is built in the cabinet constructed as above and, as shown in FIG. 1B, the camera lens 11 is directed to the outside through the opening 10a formed in the bottom case 10. When the video or digital camera is not in use, the opening 10a is covered with a lens shutter not shown. The camera lens 11 may incorporate an optical zoom mechanism.

As shown in FIG. 1C, on the top surface of cabinet, the mode switching lever 12 and the recording button 13 are provided at a part of the outer surface of the middle case 16. The mode switching lever 12 is manually slidable in directions of arrows A and B. When the mode switching lever 12 is moved in the direction of arrow B, the portable computer of the present embodiment functions as digital camera and the recording button 13 is exposed externally as illustrated. When the mode switching lever 12 is moved in the direction of arrow A, the portable computer of the present embodiment has a portable computer function known as personal digital assistant (PDA) function and the recording button 13 is covered with the mode switching lever 12.

With the mode switching lever 12 moved in the direction of arrow B to cause the portable computer to function as digital camera, the lens shutter, not shown, provided in register with the opening 10a formed in the bottom case 10 (FIG. 1B) uncovers and the camera lens 11 is exposed to the outside through the opening 10a. Concurrently, portions of liquid crystal display panel 2 in register with the openings 3a, 3b, 3c, 3d and 3e formed in the frame 3 are conditioned to function as touch keys for camera operation. Accordingly, icons or marks representing individually set functions are displayed on the portions of liquid crystal display panel 2 in register with the openings 3a, 3b, 3c, 3d and 3e. As an example, a portion in register with or corresponding to the opening 3a is conditioned to function as "telescopic" key 5 in zooming, a portion corresponding to the opening 3b is conditioned to function as "wide angle" key 6, a portion corresponding to the opening 3c is conditioned to function as "still picture" key 7, a portion corresponding to the opening 3d is conditioned to function as "moving picture" key 8 and a portion corresponding to the opening 3d is conditioned to function as "home page" key 9.

When the camera function is selected in a manner described above, an image of an object for photographing taken by the video camera is displayed as a moving picture on the display screen 4. Under this condition, if the "telescopic" key 5 is operated, then zooming will be carried out optically or electronically to provide an enlarged display of the object image on the display screen 4 and if the "wide angle" key 6 is operated, then an image of wide angle photography will be displayed.

The "still picture" key 7 and the "moving picture" key 8 are used to record images. After the "still picture" key 7 is operated by touching, a photographed image of an object for photographing is stored as a still image in a memory built in the cabinet by operating the recording button 13. When the recording button 13 is operated after the "moving picture" key 8 is operated by touching, a photographed image of an object for photographing is started to be recorded as a moving image on the memory. The recording operation is then stopped by operating the recording is button 13 again. In this manner, the recording button 23 functions differently for the case where the "still picture" key 7 is operated and the case where the "moving picture" key 8 is operated. But, if the recording button 13 is kept to be depressed after the "still picture" key 7 is operated, then still picture recording will be implemented at intervals of constant time.

Figure 11:
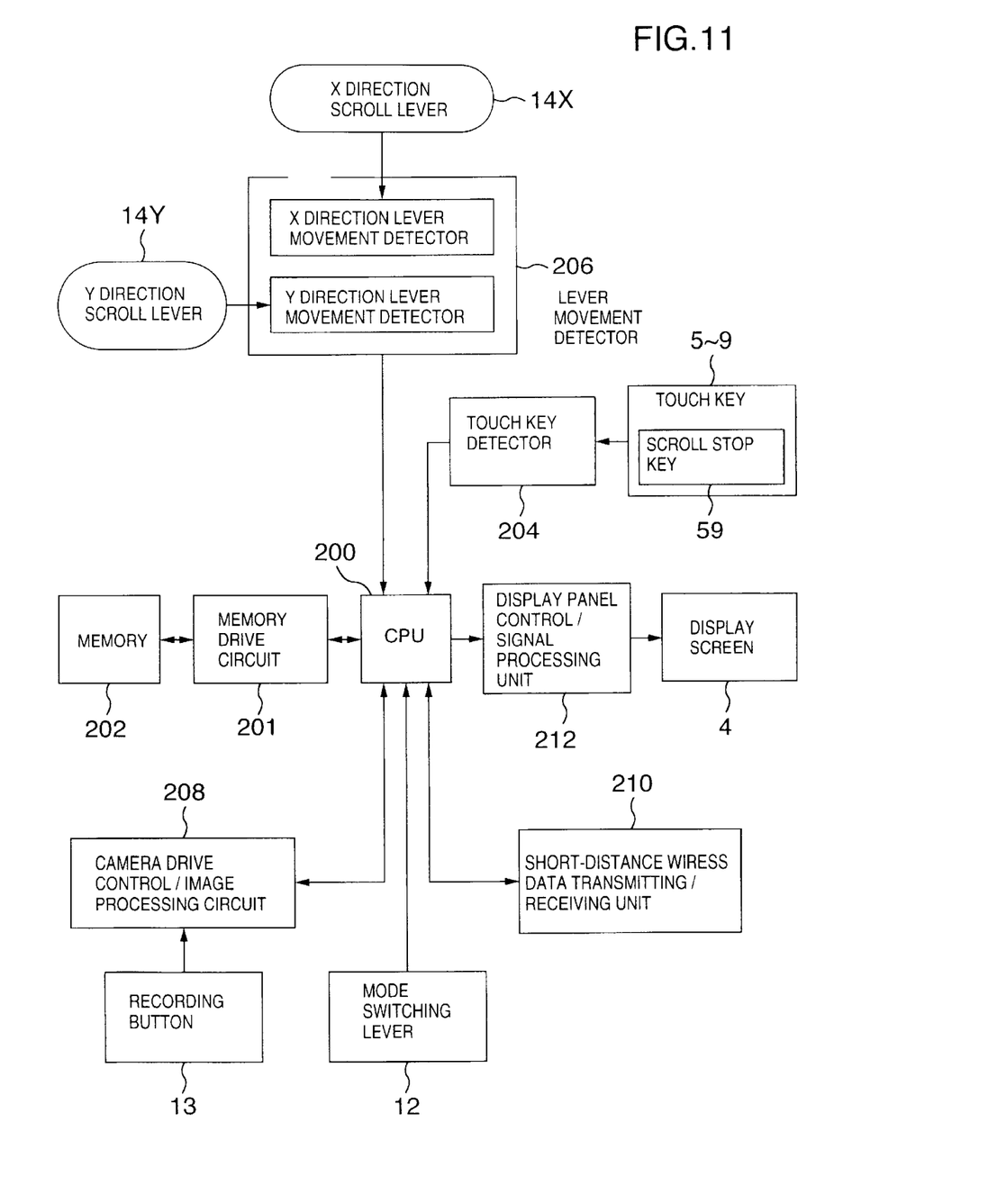
FIG. 11 is a block diagram showing an example of circuit construction of the portable computer shown in FIGS. 1A to 1F.

The "home page" key 9 is a touch key for commanding that the thus obtained still picture information or moving picture information be transmitted by radio to a home page allotted to a server, not shown, so as to be stored in the home page. The storage capacity of a built-in memory 202 shown in FIG. 11 is limited and when image information in excess of the limit is recorded on that memory, the precedent image information is rewritten. To prevent such a trouble, the "home page" key 9 is provided. When a still picture or a moving picture is about to be recorded in the above manner by operating the recording key 13, the still picture or the moving picture can be stored in the aforementioned home page by operating the "home page" key 9 in advance.

In order to read the still picture or the moving picture stored in the home page and display it on the display screen 4, the function is switched to the PDA function by moving the mode switching lever 12 in the direction of arrow A. In this case, the aforementioned keys 5 to 9 serve as touch keys necessary for execution of the PDA function including, for example, a key for reading image information from the server not shown, a key for erasing unwanted image information and a key for writing image information to the server.

Obviously, in that case, a touch key for reading a still picture or a moving picture which is stored in the memory built in the cabinet is also set.

As described above, in the present embodiment, the touch keys 5 to 9 formed on the liquid crystal display panel 2 are arranged in register with the openings 3a to 3e, respectively. Therefore, even when the apparatus is compacted and the touch keys 5 to 9 are concomitantly reduced in size more and more to narrow the space interval between them, erroneous touch on an adjacent touch key can be prevented.

Referring now to FIG. 11, there is illustrated a block diagram showing the circuit construction of the portable computer according to the FIG. 1 embodiment.

In FIG. 11, a central processing unit (CPU) 200 controls processing in the present portable computer on the basis of information stored in the built-in memory 202. A drive circuit 201 drives the memory 202. A touch key detector 204 responds to an input position touched by an operator to transmit information of one of touch keys 5 to 9 which is touched by the operator to the CPU 200. Receiving the information, the CPU 200 performs processing of the information or transmits image data from a camera drive control/image processing circuit 208 or image data received from the not shown server by a short-distance wireless data transmitting/receiving unit 210 to a display panel control unit 212 so as to display them on the display screen 4 of the display panel 2. Further, the CPU 200 transmits photographing data from the camera drive control/image processing circuit 208 to the server through the short-distance wireless data transmitting/receiving unit 210. When the X direction scroll lever 14X or the Y direction scroll lever 14Y is slid, a lever movement detector 206 detects a position and a sliding speed of the slid lever to transmit them to the CPU 200. The CPU 200 transmits an instruction for scrolling the screen in accordance with the movement of the lever to the display panel control unit 212, so that a picture on the display screen 4 is scrolled. The CPU 200 also responds to the mode switching lever 12 to switch the operation mode of the present portable computer between the camera unit operation mode and the personal digital assistant operation mode. The camera drive control/image processing circuit 208 further includes a controller for the lens shutter provided in the opening 10a formed in the bottom case 10 and when the present portable computer is in the camera mode, the controller operates to open the lens shutter. Besides, the camera drive control/image processing circuit 208 starts photography in response to actuation of the recording button 13 for the camera. It will be appreciated that the circuit of FIG. 11 may be carried on a main board or a main circuit unit (module) to be described later.

In the present embodiment, in order to permit scroll of a display image when image information is read out of the server or the built-in memory so as to be displayed on the display screen 4, the Y direction scroll lever 14Y for scrolling the display image in the Y direction (up-down direction) is provided on a part of middle case 16 forming the right side surface of the cabinet as shown in FIG. 1D and in addition, the X direction scroll lever 14X for scrolling the display image in the X direction (left/right direction) is provided on a part of middle case 16 forming the bottom of the cabinet.

When the Y direction scroll lever 14Y is moved in Y1 direction, the display image is scrolled upwards on the display screen 4 and besides, scroll is carried out at a speed conforming to a moving speed of the Y direction scroll lever 14Y. When the Y direction scroll lever 14Y is moved in Y2 direction, the display image is scrolled downwards on the display screen 4 and besides, scroll is effected at a speed conforming to a moving speed of the Y direction scroll lever 14Y. With the Y direction scroll lever 14Y stopped, scroll as above is not implemented.

Operation of the X direction scroll lever 14X is similar. More particularly, when the X direction scroll lever 14X is moved in X1 direction, the display image is scrolled to the left on the display screen 4 and besides, scroll is carried out at a speed conforming to a moving speed of the X direction scroll lever 14X. With the X direction scroll lever 14X moved in X2 direction, the display image is scrolled to the right and besides, scroll is effected at a speed conforming to a moving speed of the X direction scroll lever 14X. With the X direction scroll lever stopped, scroll operation as above is not implemented.

The moving range of the Y direction scroll lever 14Y is limited. For example, in case movement of the Y direction scroll lever 14Y is limited in the direction of arrow Y1, the display image is sometimes required to be further scrolled upwards. To meet this requirement, one of the touch keys at the operation board 3A is conditioned to function as key 59 (FIG. 11) for stopping the function of the Y direction scroll lever 14Y and X direction scroll lever 14X and as far as this touch key 59 is operated by touching, scroll can be prevented even when either of the Y direction scroll lever 14Y and X direction scroll lever is moved. With this construction, when the Y direction scroll lever 14Y reaches the aforementioned limit of the movement range, the Y direction scroll lever 14Y is returned with the touch key 59 kept to be touched and thereafter the touched condition is released and the Y direction scroll lever 14Y is moved in the same direction, thereby ensuring that scroll in the same direction can be continued. Similarly, this holds true for the X direction scroll lever.

Incidentally, in recent years, reduction in size of the portable computer provided with the camera function as above has been accelerated more and more. In spite of the accelerated size reduction, the display screen is required to be as wide as possible to permit easy visibility of display images and to this end, the arrangement of the operation keys is inevitably restricted. Conventionally, it is general to arrange the operation keys near the display screen or to provide operation keys in the form of touch keys within the display screen. If the operation keys are arranged near the display screen, the number of operation keys is limited. If the operation keys in the form of touch keys are provided within the display screen, these keys disturb images to be displayed when the display screen is reduced in size.

In the present embodiment, means for image scroll is arranged on the side surface of the cabinet where any component member is hardly provided in the past, thereby making it possible to make full use of space so as not to impair the display function even when the size is reduced. In addition, since the levers are used as the scroll means, not only the scroll amount but also the scroll speed can be changed to ensure that the speed of scroll can be accelerated or decelerated manually by the user.

In order that the X direction scroll lever 14X and Y direction scroll lever 14Y can be operated easily by fingertips of the hand when using the portable computer by holding the cabinet by hand, these levers are so arranged as to be offset toward, for example, the left-below corner of the cabinet (that is, as shown in FIG. 1F, the X direction scroll lever 14X provided on the bottom is offset to the left and as shown in FIG. 1D, the Y direction scroll lever 14Y provided on the left side surface is offset to the bottom). In this manner, good operationability of scroll can be ensured even when the computer is carried.

Further, as shown in FIG. 1D, the pen pocket 15 is formed in the left side surface of the cabinet so that a pen (not shown) for selecting/clicking a menu displayed on the display screen 4 may be inserted in or drawn out of the pocket 15.

Figure 2:
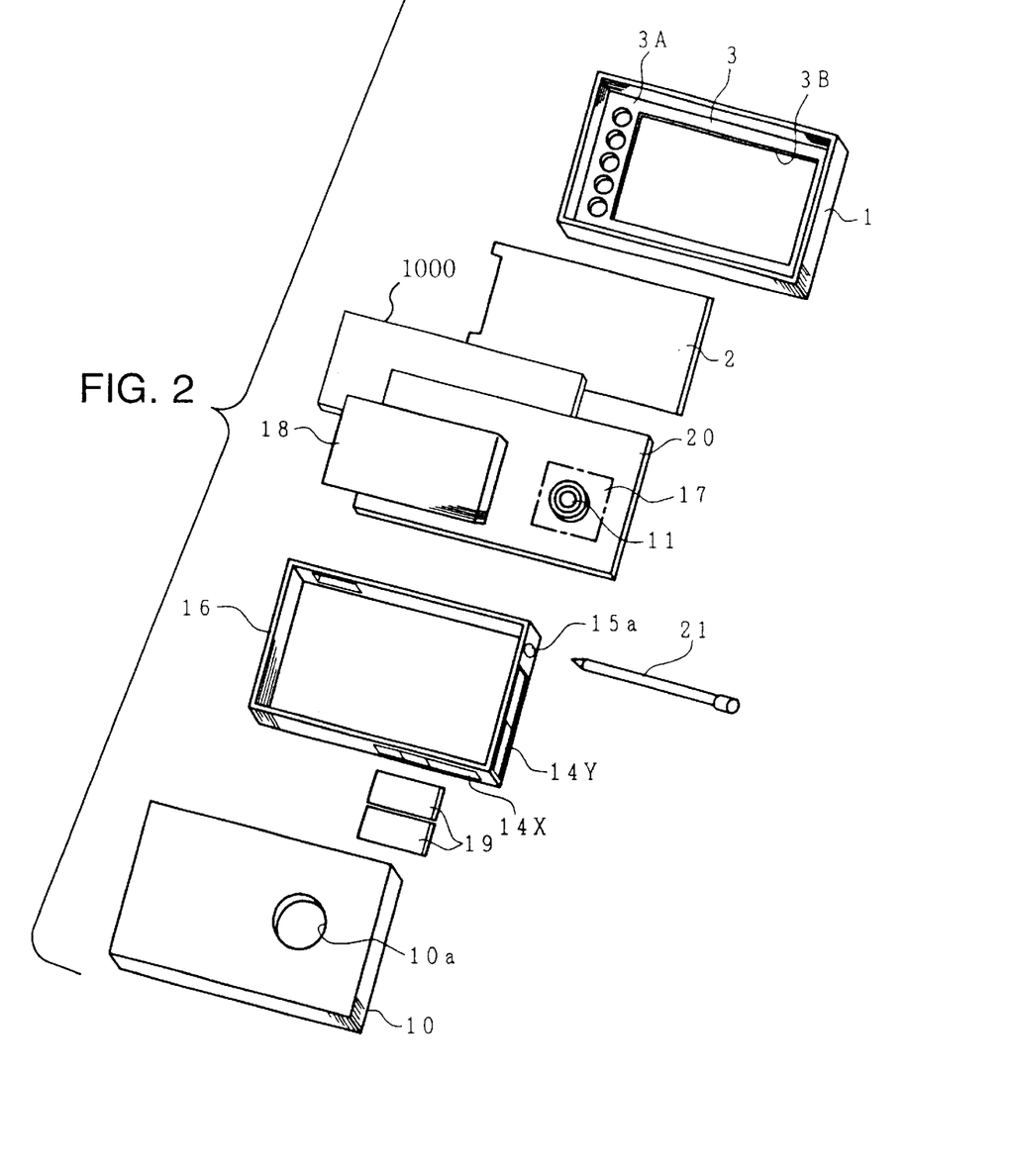
FIG. 2 is an exploded perspective view of the embodiment shown in FIGS. 1A to 1F.

The embodiment shown in FIGS. 1A to 1F is illustrated in exploded perspective view form in FIG. 2 showing an opening 15a, a CCD camera 17, a battery 18, a lens shutter 19, a main board (or a circuit unit or a circuit module) 20 and a pen 21. 1000 denotes a function extension unit as an option to be described later. The remaining components corresponding to those in FIGS. 1A to 1F are designated by identical reference numerals and will not be described herein for avoidance of prolixity.

Referring to FIG. 2, the top case 1, middle case 16 and bottom case 10 are combined with each other to form the cabinet and inside the cabinet, the liquid crystal display panel 2 is arranged on the top case 1 and the main board 20 is disposed more closely to the bottom case 10 than the liquid crystal display panel 2. The main board 20 is mounted with the CCD camera 17 provided with the CCD camera lens 11. Although not depicted in FIG. 2, the main board 20 also carries the circuits shown in FIG. 11 including the signal processing/drive circuit for the CCD camera 17 and liquid crystal display panel 2 and the drive circuit 201 for the memory. The camera lens 11 confronts the opening 10a formed in the bottom case 10.

Preferably, for standardization of the main body, functional parts attachable to the camera other than the camera lens 11 (optics) of the camera unit and the CCD or a COMS imaging device may be carried on the main board. Though not illustrated in these figures, the short-distance wireless data transmitting/receiving unit 210 for image communication with the server may also be built in or carried on the main board.

Further, the battery 18 is arranged exchangeably or chargeably in the space between the main board 20 and the inner surface of the bottom case 10. The lens shutter 19 for opening/closing the opening 10a is interposed between the camera lens 11 and the opening 10a formed in the bottom case 10. The opening 15a serving as the entrance to the pocket 15 (FIG. 1D) for the menu selecting/clicking pen 21 is formed in the middle case 16.

Figure 3:
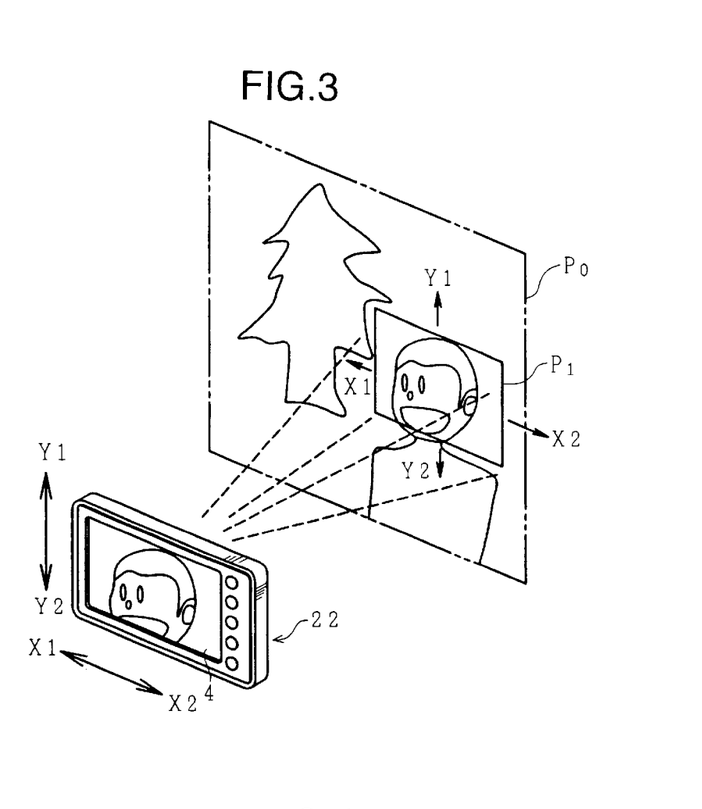
FIG. 3 is a diagram useful to explain an example of use of the embodiment shown in FIGS. 1A to 1F.

Scroll operation implemented by operating the X direction scroll lever 14X and Y direction scroll lever 14Y shown in FIGS. 1A to 1F will be described by making reference to FIG. 3 depicting the cabinet of the present embodiment at reference numeral 22, an overall image $P_0$ and a range $P_1$ of display of the overall image $P_0$ on the display screen 4. Portions corresponding to those in FIGS. 1A to 1F are designated by identical reference numerals.

For example, when image information is read out of the server and is displayed on the display screen 4, an image representing the image information sometimes has a very large area. Where the whole of the image corresponds to the image $P_0$ in this case, only the partial display range $P_1$ of the image $P_0$ is displayed on the display screen 4. In that case, according to the present embodiment, the aforementioned X direction scroll lever 14X and the Y direction scroll lever 14Y (FIGS. 1D and 1F) are operated to enable the whole of the image $P_0$ to be observed on the display screen 4.

More particularly, when the X direction scroll lever 14X is moved in the direction of arrow X1 or X2, the display range $P_1$ within the overall image $P_0$ which can be displayed on the display screen 4 is sympathetically moved in the direction of arrow X1 or X2; or when the Y direction scroll lever 14Y is moved in the direction of arrow Y1 or Y2, the display range $P_1$ within the overall image $P_0$ which can be displayed on the display screen 4 is sympathetically moved in the direction of arrow Y1 or Y2. Through this, in spite of the fact that only a part of the overall image $P_0$ is displayed on the display screen 4, the whole of the overall image $P_0$ can be observed by operating the X direction scroll lever 14X and Y direction scroll lever 14Y.

Figure 4:
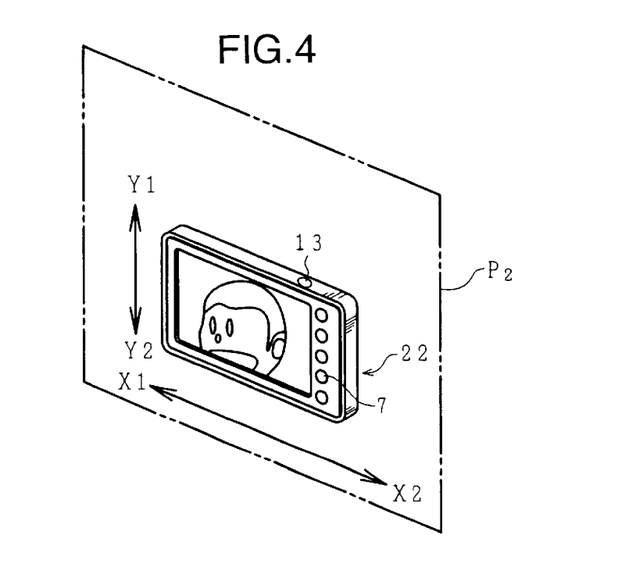
FIG. 4 is a diagram useful to explain another example of use of the embodiment shown in FIGS. 1A to 1F.

An example of use in the present embodiment is illustrated in FIG. 4 in which an object for photographing is designated by $P_2$ and portions corresponding to those shown in the preceding figures are designated by identical reference numerals.

For example, when a large-sized photographing object is imaged and stored in the server, the object is typically photographed at a position distant from the object to cover the photographing range of the whole object. But if the object contains detailed and particularized information contents such as a design diagram or a map, an obtained display image is too detailed and particularlized to permit the contents to 10 be grasped and recognized sufficiently. The present embodiment can obviate such a problem.

With reference to FIG. 4, when an object $P_2$ for photographing is a map of large area unfolded on a desk and is photographed in accordance with teachings of the present embodiment, the camera lens 11 is first directed to the object $P_2$, and the cabinet is held in place in parallel to the object $P_2$ and caused to approach the object $P_2$. Then, close shot is carried out while moving the object $P_2$ in the direction of arrow X1 or X2 or in the direction of arrow of Y1 or Y2. In this case, the mode switching lever 12 shown in FIG. 1 is moved in the direction of arrow B to set up the camera function and the "still picture" key 7 is operated by touching to set up the recording mode for still picture. Thereafter, the close shot is carried out by keeping the recording button 13 depressed.

In the close shot carried out in this manner, still pictures within the photograph range of the digital camera are recorded at intervals of constant time as far as the recording button 13 kept to be depressed. Accordingly, the close shot can cover the whole of the object $P_2$ and an image of the overall object P2 can be obtained by synthesizing partial images. In other words, the partial images are synthesized through signal processing to form a large image. Accordingly, when the large image is read out of, for example, the server and monitored, the entirety can be observed through scrolling as has been explained in connection with FIG. 3.

Figure 5:
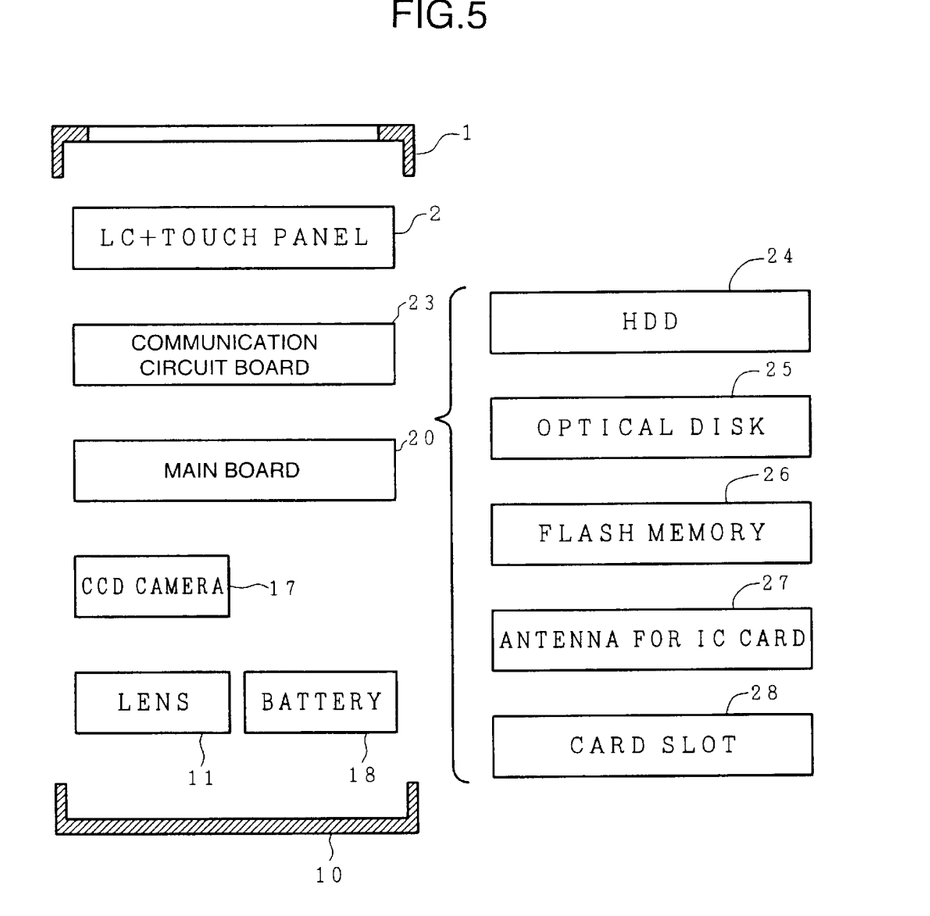
FIG. 5 is a diagram for explaining function extension units added to the embodiment shown in FIGS. 1A to 1F.

As shown in FIG. 5, in the present embodiment, the liquid crystal display panel 2, communication circuit board (image communication unit) 23, main board 20, CCD camera 17, camera lens 11 and battery 18 are arranged between the top case 1 and the bottom case 10 and functionally, an image photographed by the camera is displayed on the liquid crystal display panel 2 or transmitted to the server or an image is read out of the server and displayed on the liquid crystal display panel 2. In addition, by using the function extension unit 1000, a hard disk device 24, an optical disk unit 25, a flash memory 26, an antenna 27 for IC card and/or a card slot 28, for example, may be added to extend the function. But when the function extension unit 1000 as above is added, the thickness or distance between the top case 1 and the bottom case 10 increases and obviously, a middle case 16 (FIG. 2) having a corresponding thickness or width may be used. The function extension will be further detailed later with reference to FIGS. 6A and 6B and ensuing figures.

As described above, according to the present embodiment, the scroll levers are provided on the side surface of the cabinet to effectively utilize the space of the cabinet, with the result that the space of the operation board can be reduced without impairing the scroll function necessary for image display and without causing the scroll unit to adversely affect display images on the display screen. Besides, since the levers are used as the scroll unit, the scrolling speed can be changed in accordance with the operating speed of the levers. In addition, the side surface of the cabinet is usually of a dead space and therefore, the scroll levers can easily be arranged at locations where they can be easily operated with fingertips while holding the cabinet by one hand to prevent operationability of scrolling from being impaired.

Next, embodiments of a portable computer added with various kinds of function extension units will be described.

Firstly, the fundamental construction of this type of portable computer will be described. In the portable computer added with function extension unit, between a top case provided with a flat liquid crystal display panel and a bottom case provided with a main board and covering the rear surface of the top case, a function extension unit is interposed in a stacking fashion, with respect to the top and bottom cases, in the depth direction of the liquid crystal display panel and is housed by a middle case interposed between the top case and the bottom case. By changing the thickness of the middle case or using a plurality of middle cases, a plurality of function extension units can be arranged. Besides, the added function extension unit may be so constructed as to extend the function of the portable computer by, for example, inserting/drawing out an input/output medium.

With the construction as above, the efficiency of packaging the function extension unit can be improved while promoting the portability of the portable computer and in addition, the function of the portable computer can be extended easily when the user inserts/draws out the input/output medium.

Referring now to FIGS. 6A to 6C, FIGS. 7 to 9 and FIGS. 10A to 10C, the embodiments of the portable computer in which the function extension unit is arranged in a stacking fashion will be described.

Figure 6A:
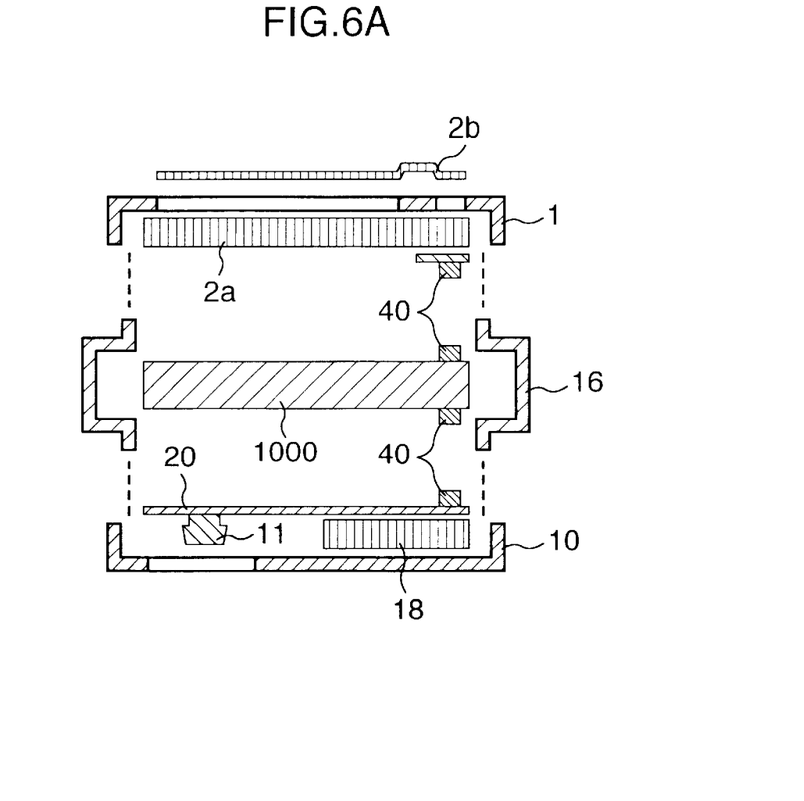
FIGS. 6A to 6B are diagrams showing the construction of a first embodiment of a portable computer added with function extension unit.
Figure 6B:
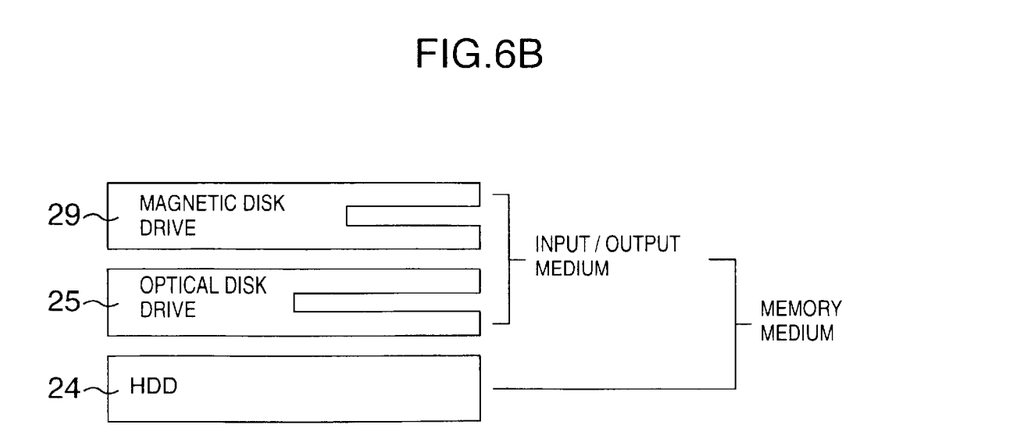

In a first embodiment of the portable computer added with function extension unit shown in FIGS. 6A and 6B, a memory medium serving as function extension unit is arranged in a stacking fashion. The memory medium added as function extension unit includes at least one of a hard disk unit 24, an optical disk unit 25 and a magnetic disk unit 29 which are shown in FIG. 6B.

As shown in FIG. 6A, in the present embodiment, a cabinet is constructed of a top case 1, a middle case 16 and a bottom case 10. Inside the cabinet, there are provided a camera lens 11, a battery 18, a main board 20, the function extension unit as designated by reference numeral 1000, and a liquid crystal display panel and a lens shutter which are not illustrated.

The top case 1 is mounted with the liquid crystal display panel including a liquid crystal display device 2a and a touch panel sheet 2b. The bottom case 10 is mounted with the main board 20, battery 18 and the lens shutter, the main board 20 carrying a memory, a camera lens 11, a signal processing circuit and a drive circuit.

Then, the function extension unit 1000 which includes at least one of the hard disk unit 24, optical disk unit 25 and magnetic disk unit 29 shown in FIG. 6B is arranged in a stacking fashion between the liquid crystal display panel (liquid crystal display device 2a) and the main board 20 and is housed by the middle case 16.

The aforementioned liquid crystal display panel (liquid crystal display device 2a), function extension unit 1000 and main board 20 are mutually connected through connectors 40. The top case 1 and the bottom case 10 are connected to each other through the medium of the middle case 16 mounted with the mode switching lever 12, recording button 13 and scroll levers 14X and 14Y shown in FIGS. 1C, 1D and 1F. The mode switching lever 12, recording button 13 and scroll levers 14X and 14Y are connected to the main board 20 by wiring lines not shown.

When the portable computer constructed as above is added with the hard disk device 24 representing the function extension unit 1000, it functions as will be described below.

Incidentally, the portable computer of the present embodiment has both the personal digital assistant (PDA) function and the camera function as has already been described and switching between these functions is implemented by the mode switching lever 12 shown in FIG. 1C. For example, when the portable computer of the present embodiment is desired to function as digital camera, the mode switching lever 12 is moved in the direction of arrow B shown in FIG. 1 so that the recording button 13 and camera lens 11 expose from the cabinet and besides, the operation board provided for the liquid crystal display panel 2 is switched to the function for operating the camera. The function of the operation board is the same as that in the embodiment explained in connection with FIGS. 1A to 1F and will not be described herein.

The portable computer is held and while operating the operation board, a still picture or a moving picture of an object is taken by means of the camera lens 11. Photographed image data is stored in the built-in memory or the hard disk unit 24 by depressing the recording button 13.

The photographed image is read out of the built-in memory or the hard disk unit 24 by operating the operation board and a part of the image is displayed on the liquid crystal display panel 2. With the aim of observing an overall photographed picture or all images to be displayed, the scroll levers 14X and 14Y are operated to scroll the screen as shown in FIGS. 3 and 4.

Figure 6C:
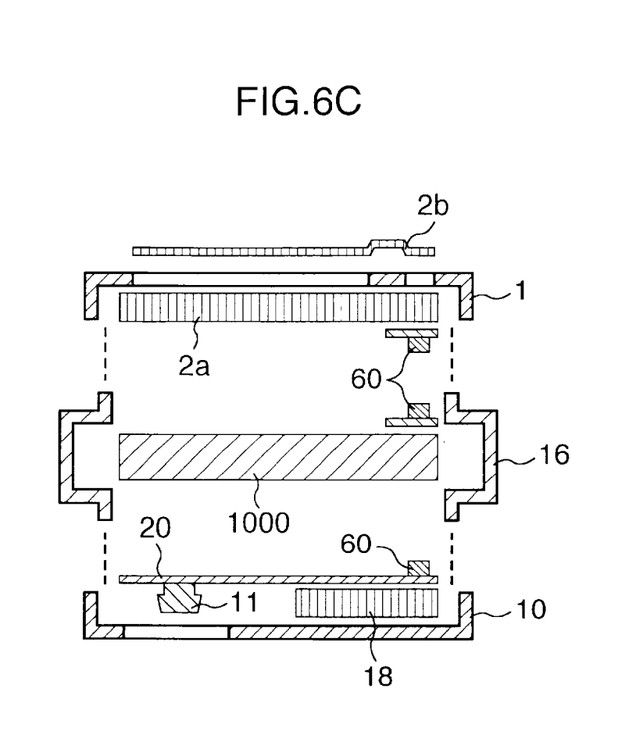
FIG. 6C is a diagram showing the construction of a second embodiment of the portable computers added with function extension unit.

In a second embodiment of the portable computer with function extension unit shown in FIG. 6C, short-distance wireless data transmitting/receiving units 60 based on a short-distance communication scheme are used in place of the connectors 40 in FIG. 6A. In connection with the liquid crystal display device 2a, a small circuit board is provided for the device 2a on the side thereof confronting the function extension unit 1000 and a transmitting/receiving unit 60 is carried on the small circuit board. On any one side of the function extension unit 1000, another transmitting/receiving unit 60 is carried similarly. Still another transmitting/receiving unit 60 is carried directly on the main board 20. The arrangement shown in FIG. 6C is of course an example for mere explanation and it will be appreciated that the arrangement is not limitative. In case the electric wave is used as a communication medium, the short-distance wireless data transmitting/receiving unit 60 may be implemented by using well-known Bluetooth specification such as, for example, Bluetooth version 1.0 or PHS (personal handyphone system) specification and other techniques. In case light is used as a communication medium, the unit 60 can be implemented by using the technique of IrDA (infrared data association) specification which is also well-known. In this case, however, the transmitting/receiving unit 60 must be provided on the side of function extension unit 1000 confronting the main board 20. Advantageously, by using the short-distance wireless data transmitting/receiving units as above, it is expected that wiring between the units can be dispensed with to increase the degree of freedom of packaging and in addition, generation of faulty contact can be excluded to promote reliability of the apparatus. Excepting the use of the transmitting/receiving units 60, the present embodiment is identical to the embodiment of FIGS. 6A and 6B and will not be described further. The disclosure of the Bluetooth version 1.0, PHS (Personal Handy Phone System) specification and IrDA (Infrared Data Association) specification are hereby incorporated by reference.

As described above, the portable computers according to the embodiments of FIGS. 6A to 6C comprise the hard disk unit 24 representing a memory medium of large capacity and hence a shortage of capacity of the built-in memory can be supplemented. Moreover, there is no need of transmitting the photographed image data to the server and storing it therein and therefore, image data of large capacity can be saved.

Figure 7:
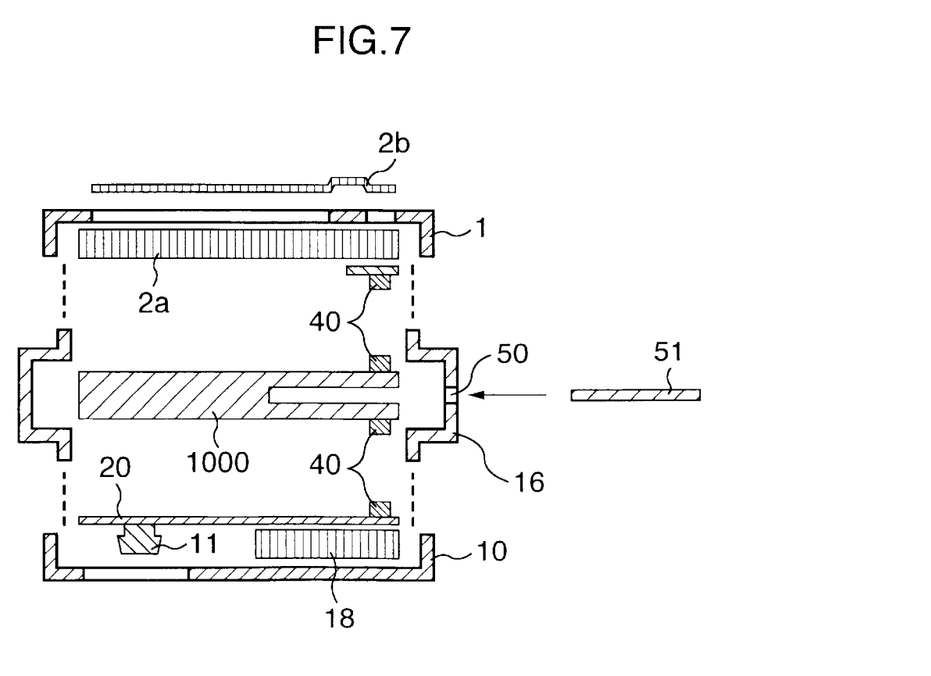
FIG. 7 is a diagram showing the construction of a first modification of the embodiment of FIGS. 6A and 6B.

The first embodiment of FIGS. 6A and 6B may be modified as shown in FIG. 7 to incorporate at least one of optical disk unit 25 and magnetic disk unit 29 added as function extension unit 1010. When at least one of the optical disk unit 25 and magnetic disk unit 29 is arranged in a stacking fashion between the liquid crystal display panel (liquid crystal display device 2a) and the main board 20, a middle case 15 is formed with an insertion port 50 for an input/output medium 51 such as for example a magnetic optical disk (hereinafter referred to as "MO") or a floppy disk (hereinafter referred to as "FD"). The input/output medium 51, "MO" or "FD", is inserted to the insertion port 50 and a photographed image is stored in, for example, the "MO" or "FD". Other components and display of the photographed image are identical to those in the case of the addition of the hard disk unit 24 and will not be described.

With the above construction, effects similar to those obtained in the embodiment added with the hard disk unit 24 can be attained. Since the input/output medium 51 such as "MO" or "FD" is used, insertion or draw-out of the input/output medium can be facilitated and data interchange with a desk-top personal computer, a mobile personal computer and other digital cameras can be effected with ease.

The embodiments of FIGS. 6A to 6C and the first modification of FIG. 7 have been described as having the camera function of digital camera but may have another camera function of, for example, video camera.

Figure 8:
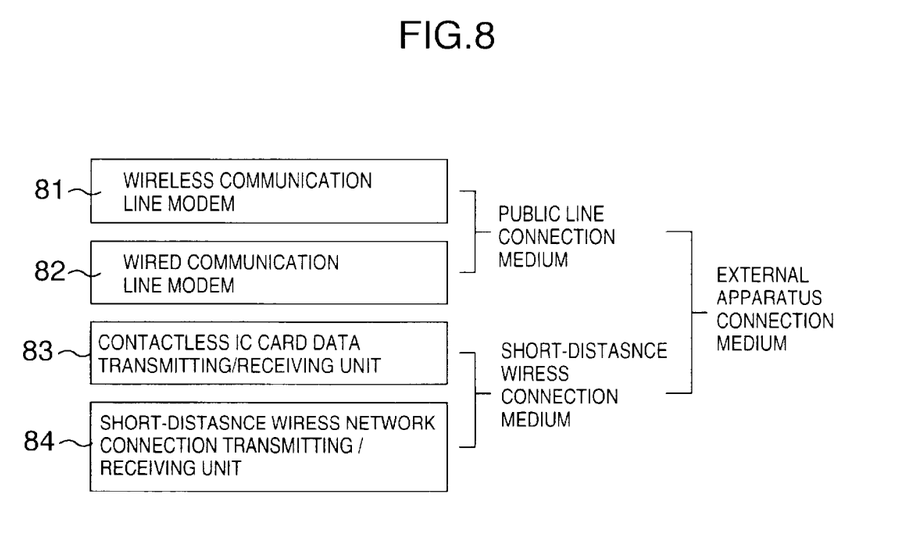
FIG. 8 is a diagram showing a second modification of the embodiment of FIGS. 6A and 6B.

Referring now to FIG. 8, a second modification of the first embodiment of FIGS. 6A and 6B will be described in which an external apparatus connection medium representing the function extension unit 1000 is added.

As exemplified in FIG. 8, the additional external apparatus connection medium includes a public line connection medium such as for example a wireless communication line modem 81 and a wired communication line modem 82 and a short-distance wireless connection medium such as for example a contactless IC card data transmitting/receiving unit 83 and a short-distance wireless network connection transmitting/receiving unit 84. Desired specifications such as the previously-described bluetooth, PHS and IrDa may be used for these transmitting/receiving units.

Firstly, in the portable computer according to the second modification, at least one of the public line connection medium and short-distance wireless connection medium added as function extension unit 1000 in FIG. 6A is arranged in a stacking fashion between the liquid crystal display panel (liquid crystal display device 2a) and the main board 20 and is connected to the liquid crystal display panel and the main board 20 by connectors 40. The remaining components are similar to those in the embodiment of FIG. 6A and will not be described herein. Obviously, the wireless transmitting/receiving units 60 may be used in place of the connectors 40.

When the wireless communication line modem 81 representing the public line connection medium is added as function extension unit 1000, the portable computer functions as will be described below.

As described previously, the portable computer of the present invention has the personal digital assistant (PDA) function and the camera function and switching between these functions is carried out by the mode switching lever 12. For example, when the portable computer is conditioned to implement the PDA function, the mode switching lever 12 is moved in the direction of arrow A in FIG. 1C to cover the recording button 13, to cause the lens shutter 19 to cover the camera lens 11 and to cause the operation board provided for the liquid crystal display panel 2 to be switched so as to have the function for operating the personal digital assistant (PDA). The function of the operation board is identical to that described in connection with FIGS. 1A to 1F and will not be described herein.

Then, by operating the operation board, data communication with external apparatus and internet connection can be effected. In case the wired communication line modem 82 is added as function extension unit 1000, a function similar to that in the case of the addition of the wireless communication line modem 81 can also be fulfiled.

Next, when the contactless IC card data transmitting/receiving unit 83 representing the short-distance wireless connection medium is added as function extension unit 1000, the portable computer functions as will be described below.

Firstly, by operating the mode switching lever 12 provided on the side surface of the middle case 16 as shown in FIG. 1C, the portable computer is switched to have the PDA function. The mode switching and operation board switching are similar to those in the case of addition of the public line connection medium and will not be described herein. By operating the operation board, data communication between the portable computer and other apparatus or the contactless IC card can be effected by a connection scheme using electric wave or light similar to that described previously.

The apparatus constructed as above can be used for transmission and reception of, for example, security codes, which restrict the use of apparatus and the network connection, to prevent an unauthorized use of the apparatus and network by another person.

Next, when the short-distance wireless network connection transmitting/receiving unit 84 is added, the portable computer functions as will be described below.

Firstly, by operating the mode switching lever 12 provided on the side surface of the middle case 16 as shown in FIG. 1C, the function of the portable computer is switched to the PDA function. The mode switching and the operation board switching are similar to those in the case of provision of the radio communication line modem 81 and will not be described herein. Then, by operating the operation board, a wireless connection to an intranet of company which is prepared in advance can be permitted so as to collect information or a small wireless network between apparatus carrying an electric wave type antenna can be established so as to perform communication.

With the above construction, a network conforming to an activity environment sought by a user can be established.

Figure 9:
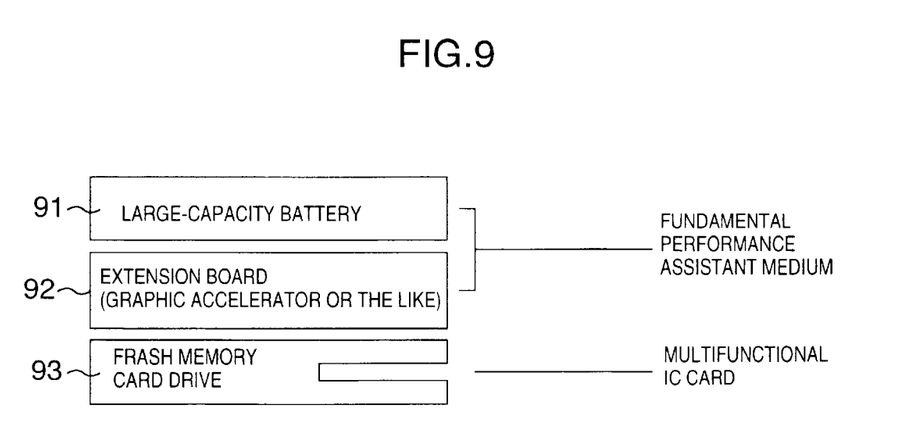
FIG. 9 is a diagram showing a modification of the embodiment of FIGS. 6A and 6B and the embodiment of FIG. 6C.

Turning to FIG. 9, a modification based on the embodiment of FIGS. 6A and 6B, the embodiment of FIG. 6C and the modification of FIG. 7 will be described.

Exemplified in FIG. 9 are a fundamental performance assistance medium representing the function extension unit 1000 and a multifunctional IC card unit IG representing the functional extension unit 1010, the function extension unit 1000 or 1010 being added between the liquid crystal display panel (liquid crystal display device 2a) and main board 20 of the portable computer constructed as shown in FIGS. 6A to 6C or FIG. 7.

For example, in the portable computer according to the present modification, the fundamental performance assistance medium includes and an extension board 92 for main CPU or graphic display chip and a large-capacity battery 91, and at least one of them is added as function extension unit 1000 in a stacking fashion between the liquid crystal display panel (liquid crystal display device 2a) and the main board 20 and the extension board or the large-capacity battery is connected to the liquid crystal display panel (liquid crystal display device 2a) and main board 20 by the connectors 40 or wireless data transmitting/receiving units 60. The remaining components are similar to those described previously and will not be described herein. It will be appreciated that a battery may be provided for each of the extension board and drive unit.

When the extension board 92 is exemplarily added in the above construction, the response speed of the portable computer can be increased, the memory capacity can be increased and the fundamental performance of the portable computer can be improved. By adding the large-capacity battery 91, a longtime use of the portable computer can be ensured.

As shown in FIG. 9, in the portable computer according to the present modification, the multi-functional IC card unit such as for example a flash memory card drive 93 is added as function extension unit 1010 shown in FIG. 7 in a stacking fashion between the liquid crystal display panel 2 and the main board 20 and is connected to the liquid crystal display panel (liquid crystal display device 2a) and the main board 20 by the connectors 40 or the wireless data transmitting/receiving units 60. The remaining components are similar to those in the foregoing embodiments and will not be described herein.

With the multifunctional IC card unit arranged in the manner as above, the function of the portable computer can be extended by inserting/drawing out a plurality of IC cards having the functions explained in connection with the foregoing embodiments.

Figure 10A:
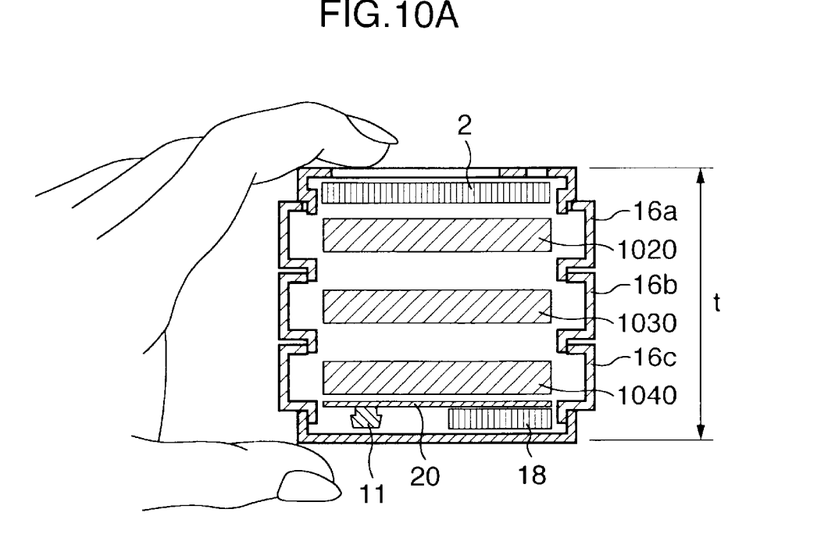
FIGS. 10A to 10C are diagrams for explaining a third embodiment of the portable computer with function extension unit.

In the embodiments of the invention set forth so far, the portable computers have been described in which the middle case 16 is of one stage so that at least one function extension unit having one function is interposed between the liquid crystal display panel (liquid crystal display device 2a) and the main board 20. In the present invention, however, a plurality of stages of middle case 16 may be provided as shown in FIG. 10A or the thickness of the middle case 16 can be changed, though not illustrated. By providing the plurality of stages of middle case 16 or changing the thickness thereof, function extension units having the previously-described individual functions can be combined with each other to thereby further improve the function of the portable computer.

Figure 10B:
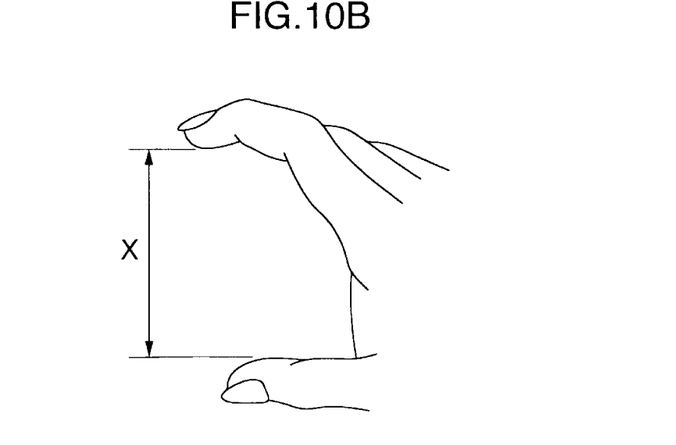
Figure 10C:
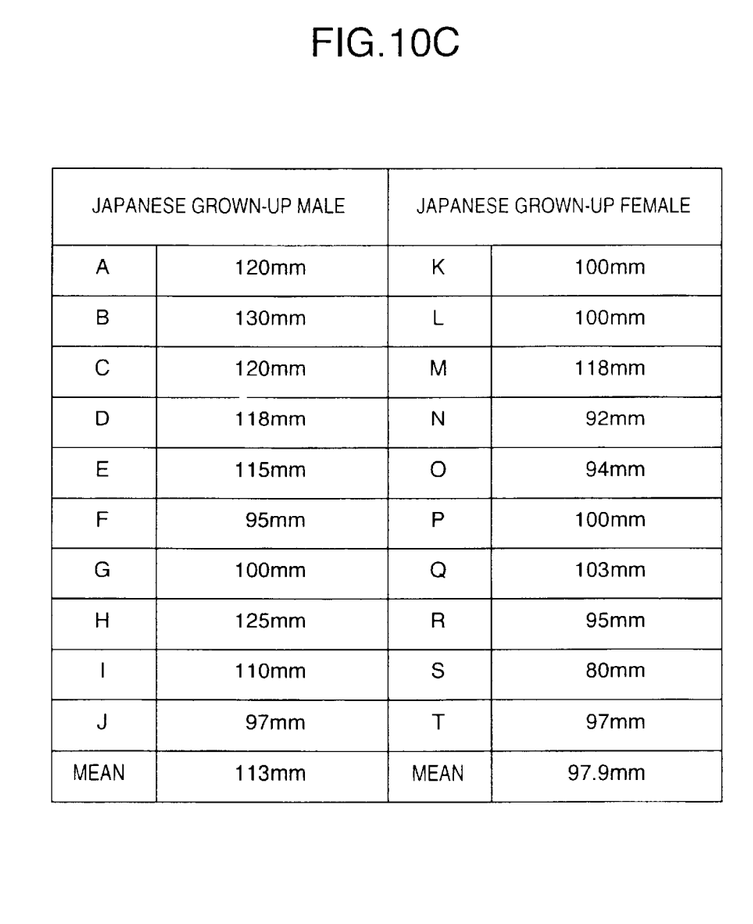

Referring now to FIGS. 10A to 10C, a second embodiment of the portable computer with function extension unit will be described. The size (thickness t) of the portable computer of the present embodiment in which a plurality of extension units are added will first be explained below.

In the present embodiment, it is presupposed that the portable computer is carried to serve as a mobile apparatus. As shown in FIG. 10A, in the portable computer of the present embodiment, a plurality of function extension units 1020, 1030 and 1040 are added and housed by a plurality of middle cases 16a, 16b and 16c, respectively, and the thus constructed portable computer is held by hand.

In the portable computer according to the present embodiment, from the viewpoint of its apparatus characteristics, the thickness t is set by considering that the apparatus can be held firmly by hand by a user while being carried about and good operationability can be ensured during operation.

For setting of the thickness t, body size measurement values of principal users of the portable computer represented by grown-up males and females, for example, values of distance X between fingers holding the portable computer as shown in FIG. 10B are measured and the thickness t of the portable computer is set on the basis of an average value of measured values.

FIG. 10C is a table showing values of the distance X measured for implementing the portable computer of the present embodiment and averages of the measures values. For example, 10 grown-up males and 10 grown-up females are chosen randomly, the distance X between fingers is measured for individual persons and averages are calculated.

In the portable computer according to the present embodiment, the thickness t is increased when the function of the portable computer is extended by adding the plurality of function extension units 1020, 1030 and 1040 and mounting them in the plurality of middle cases 16a, 16b and 16c, respectively. The function of the portable computer can be improved by increasing the number of function extension units to be added but the number of added function extension units being excessively large as a result of, for example, addition of function extension units for extension of functions unneeded by the user is not preferable from the standpoint of consumption power.

The more the number of added function extension units, the higher the consumption power in the portable computer becomes. Consequently, there results a shortage of capacity of the built-in battery 18, so that usable time of the portable computer is shortened to prevent stable supply of power and the operation of the portable computer becomes unstable. Accordingly, in the present embodiment, the thickness t of the portable computer is set on the presupposition that not only portability of the portable computer but also stable supply of power can be met.

Gathering from the above, the thickness t of the portable computer according to the present embodiment is set to have an upper limit of 100 mm or less. By making the thickness t 100 mm or less, portability of the portable computer can be promoted and operationability thereof can be improved.

Besides, with the upper limit of the thickness t set to 100 mm or less, addition of function extension units for extension of functions unneeded by the user can be avoided and consumption power can be reduced. Therefore, power can be supplied stably to the liquid crystal display panel and main board as well as the function extension units added for extending functions required by the user within the range of allowable capacity of the built-in battery 18, thereby ensuring that usable time of the portable computer can be prolonged and its operation can be stable.

As described above, according to the embodiments of the invention, the previously-described advantages can be attained by ensuring that the hard disk unit representing a large capacity memory medium capable of easily extending the function while maintaining good portability can be provided to supplement the memory capacity of the built-in memory so as to save image data of large capacity, that insertion/draw-out of the input/output medium can be facilitated and that data interchange with a desk top personal computer, a mobile personal computer and other digital cameras can be facilitated. In addition, it will be appreciated that other various potential advantages can be obtained.

While the present invention has been particularly described and shown with reference to the embodiments thereof, it will be understood by those skilled in the art that various changes in form and detail and omissions may be made therein without departing from the scope of the invention.

What is claimed is:

1. A portable electronic computer having a camera unit and a portable information terminal, comprising:
    a cabinet having a top case forming a front of said cabinet, a bottom case forming a rear of said cabinet and a middle case disposed between said top casing and bottom casing and forming a upper surface, a lower surface and side surfaces of said cabinet;
    wherein said cabinet has arranged therein a display unit so as to be viewable from the front of said cabinet, a camera lens of said camera unit is arranged at the rear of said cabinet, a communication unit which communicates outside of said cabinet, and an electronic circuit which executes different processings;
    wherein said cabinet has a scroll unit which scrolls image information being displayed on said display unit, said displayed image information being image information taken by said camera unit or external image information obtained from outside via said communication unit; and
    wherein said scroll unit includes a first scroll lever provided on one side surface of said cabinet and a second scroll lever provided on another side surface of said cabinet adjacent said one side surface, wherein said first scroll lever scrolls said image information being displayed on said display unit in an up/down direction and said second scroll lever scrolls said image information being displayed on said display unit in a right/left direction.

2. A portable electronic computer according to claim 1, further comprising a mode switching switch which switches an operation mode of said portable electronic computer between a mode in which the computer operates as a camera unit and a mode in which the computer operates as a portable information terminal,
    wherein said mode switching switch includes a slidable lever arranged to operate said portable electronic computer as the camera unit when said slidable lever is moved in one direction and operate said portable electronic computer as the electronic computer when said slidable lever is moved in the other direction.

3. A portable electronic computer according to claim 2, further comprising a recording button of said camera unit which is exposed so as to be operable when said slidable lever is moved in the one direction.

4. A portable electronic computer according to claim 3, wherein said display unit includes a liquid crystal display panel and said liquid crystal display panel includes at least one touch key, said touch key being assigned with different functions in accordance with the position of said slidable lever.

5. A portable electronic computer having a camera unit and a portable information terminal, comprising:
    a cabinet having a top casing, a bottom casing and at least one middle casing;
    wherein said top casing has therein a flat display unit arranged to be visible from outside;
    wherein said bottom casing has therein said camera unit, a communication unit for communication with outside of said cabinet, and a circuit board provided with an electronic circuit for execution of different processings;
    wherein said at least one middle casing has outside thereof a scroll unit which scrolls an image being displayed on said display unit, and inside thereof a function extension unit disposed between said display unit and said circuit board for extending the functions of said camera unit and portable information terminal;
    wherein said scroll unit includes a first scroll lever provided on one surface of said at least one middle casing and a second scroll lever provided on another surface of said at least one middle casing adjacent the one surface, said first scroll lever scrolling information displayed on said display unit in an up/down direction and said second lever scrolling the information displayed on said display unit in a right/left direction.

6. A portable electronic computer according to claim 5, wherein said function extension unit includes a memory medium for increasing memory capacities of said camera unit and said portable information terminal.

7. A portable electronic computer according to claim 5, wherein said function extension unit includes an external apparatus connection medium for enabling said camera unit and said portable information terminal to perform information transmission to an external apparatus.

8. A portable electronic computer according to claim 5, wherein said function extension unit includes an assistant medium for improving the fundamental performances of said camera unit and said portable information terminal.

9. A portable electronic computer according to claim 5, wherein a plurality of said middle casings are provided between said top casing and said bottom casing, and said plurality of middle casings each have therein said function extension unit.

10. A portable electronic computer having a camera unit and a portable information terminal, comprising:
    a cabinet having a top casing forming a front of said cabinet, a bottom casing forming a rear of said cabinet and a middle casing disposed between said top casing and bottom casing and forming a upper surface, a lower surface and side surfaces of said cabinet;
    wherein said cabinet has therein a display unit arranged to be viewable from the front of said cabinet, a camera lens of said camera unit being arranged at the rear of said cabinet, a communication unit which communicates with outside of a cabinet and an electronic circuit which executes different processings;

wherein said display unit includes a liquid crystal display panel, said liquid crystal display panel having a display region for display of image information taken by said camera unit or image information obtained from outside via said communication unit and an operation region for operating said camera unit and portable information terminal;

wherein said top casing has a first opening corresponding to the display region of said liquid crystal display panel and a second opening corresponding to said operation region;

wherein said middle casing has at a surface thereof a mode switching switch and a scroll unit, said mode switching switch switching an operation mode of said portable electronic computer between a mode in which the computer operates as a camera unit and a mode in which the computer operates as a portable information terminal, and said scroll unit scrolling image information which is being displayed on said display unit; and wherein said scroll unit includes a first scroll lever provided on one surface of said middle casing and a second scroll lever provided on another surface of said middle casing adjacent the one surface, said first scroll lever scrolling the image information displayed on said display unit in an up/down direction and said second lever scrolling the image information displayed on said display unit in a right/left direction.

11. A portable electronic computer according to claim 10, wherein said operation region includes a key for stopping the function of said scroll unit when said scroll unit reaches a limit position of a movable range thereof.

* * * * *